UNITED STATES PATENT OFFICE.

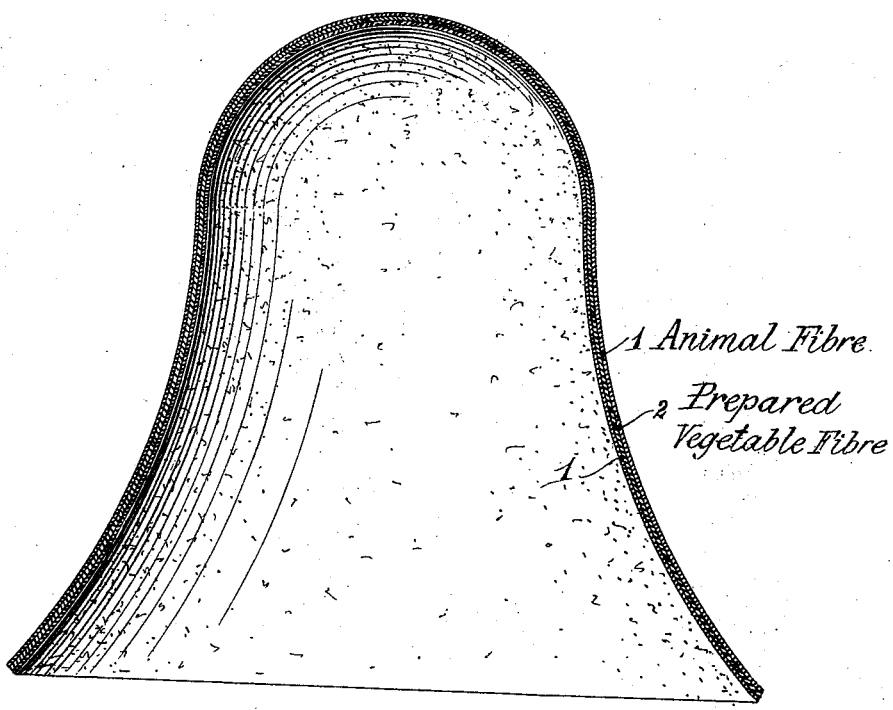

ANTENORE FUSAI, OF BIELLA, ITALY, ASSIGNOR TO ALFREDO BALADA, OF BIELLA, ITALY.

FELT.

SPECIFICATION forming part of Letters Patent No. 689,713, dated December 24, 1901.

Application filed February 1, 1900. Serial No. 3,634. (No specimens.)

*To all whom it may concern:*

Be it known that I, ANTENORE FUSAI, a subject of the King of Italy, residing at Biella, in the Kingdom of Italy, have invented certain new and useful Improvements in Felt; and I do hereby declare that the following is a full, clear, and exact description of the same.

This invention has for its object a special kind of felt, which is composed of alternate strata of vegetable and animal fibers properly felted together. The outer sides of the felt are made of animal strata, so that the same looks from the outside exactly like a felt made of animal fibers only. The vegetable fibers employed in the manufacture of this felt are those known in commerce under the names of "kapok" (*eriodendron*) and "ceiba."

The felting of the vegetable and animal fibers may be effected by any known process; but the following is specially recommended for obtaining a good result. According to this process the vegetable fibers are rendered suitable for felting by submitting them after a thorough cleansing to chemical processes exerting upon them an oxidating, disintegrating, and roughening action. This action is effected by means of baths, the first of which contains mercury in solution. The second bath contains chromic acid and is made from substances capable of developing such acid—such, for example, as bichromate of potash, from which chromic acid can be developed by sulfuric acid. To this bath may be added other substances possessing properties such as fit them to coöperate to improve the felting qualities of the fiber—such, for instance, as gallic acid, nitric acid, hydrochloric acid, and their compounds or derivatives. In conjunction with these acids there may be employed tannin, enocianine, (the coloring-matter of wine,) or sulfate of copper or of iron or their components or derivatives. The proportions of the said oxidant materials vary in the preparation of the baths, according to the fineness and quality of the felt to be made. If, for example, a good hat-felt is wanted, the vegetable fibers must be submitted after cleaning to a first bath composed approximately as follows: one thousand parts, by weight, of nitric acid, two hundred and fifty of mercury, and three thousand of water. This bath imparts a yellow color, usually called "yellow secrete," to the fiber on account of the oxidation of the nitrate of mercury dissolved in the bath and its adherence to the fiber in the form of an insoluble precipitate. When a large proportion of water is employed, the yellow coloration is pale or pallid and is called "pallid secrete." This solution is employed in the proportion of from two to three parts, by weight, to one hundred parts, by weight, of water to each two parts, by weight, of the vegetable fibers, the bath being at a temperature of about 40° centigrade. The said fibers are first saturated with water. The vegetable fibers are allowed to remain in this bath for a time, usually about ten to fifteen minutes, and they are then removed from the bath and placed and allowed to remain in another vessel for about twenty-five hours to dry them, and then they are submitted to the action of a second bath composed of bichromate of potash, two to six per cent., by weight, of the weight of fiber treated; tannic acid, one to two per cent.; acetic acid, one to two per cent.; water, twenty-five times the weight of fiber treated, and acid coloring-matters of the desired color and in a quantity corresponding to the degree of coloring desired. The vegetable fibers are plunged into said second bath at a temperature of about 40° centigrade, and then the temperature is raised to about 90° centigrade. After they have remained from ten to fifteen minutes at this temperature they are removed to another vessel, where they are allowed to stand alone for about twenty-four hours and, lastly, dried and blown by the ordinary processes. A further action may be exerted upon the fibers so prepared by means of sulfuric acid during the fulling. The ordinary doses of sulfuric acid must be increased not less than of one-third, and it will be well to add in the fulling-machine one per cent. of bichromate of potash, tincture of enocianine, or other oxidating, disintegrating, and roughening and coloring-matters, which will vary in quality and proportions in accordance with the requirements of practice. The preparation of the baths depends also upon the quality and strength of the chemical preparation (pallid or yellow secrete) taken up by the fibers.

It may be said, as a rule, in the treatment of mixtures of animal and vegetable fibers, that starting from the hereinbefore-said formulas, as adapted to the manufacture of a felt for a hat, the doses for these formulas must be increased in proportion with the quantity of vegetable fiber employed.

For the manufacture of felt for clothes, caps in general, carpets, shoes, &c., the above formulas are susceptible of reduction if as animal material wool is employed, the wool having reëntering properties much greater than the hair of the hare and the rabbit and being capable, with a little help from roughening agents, of bringing the vegetable materials to the desired point of felting.

In the manufacture of coarse felts, as felts for paper-mills, horse-clothes, beds, &c., where very coarse animal material is used, which is little adapted by itself to cause the vegetable material to form into felt, the doses of the oxidizing materials must be increased and for every special case a special mixture of them be combined, so as to obtain the desired result.

To improve the felting of the vegetable hair and its combination with the animal hair, it may be useful to mix with the vegetable fibers (before preparing them) the detritus of animal materials—for instance, the remainders and the offscourings of hats, residues from the manufacture of felt, clippings, &c. Said offscourings are first passed into a strongly-acid bath (sulfuric and nitric acids) to break down the fibers too large and unfelted. Afterward they are put very quickly into an alkaline bath and washed in abundant pure water. The said residues when so treated are ready to be employed and when dried are employed by mixing them, in the proportions of from five to forty and even fifty per cent., with the vegetable fibers.

The vegetable fibers properly prepared, as hereinbefore described, either alone or mixed with residues of animal fibers, are felted with the animal fibers by intercalating strata of the same between strata of vegetable fibers, leaving on each outer side of the finished felt a stratum of animal felt, so that the felt looks from the outside exactly like a felt fully made of animal fiber.

Usually in manufacturing felt for hats a stratum of vegetable fibers is placed between two of animal fibers.

No further particulars as to the finishing of the felt are added here, as it can be effected by any of the known processes.

The accompanying drawing illustrates in section a hat made according to my invention.

The prepared vegetable fibers, as described, are shown at 2 in a continuous stratum intercalated between and connected by felting with two strata 1 of animal fibers. The outer finish of the hat, therefore, is exactly as good as if it were made entirely of animal fiber, while the inner stratum of cheaper vegetable fiber gives the necessary thickness at a considerably-reduced expense.

Having thus described my invention, what I claim as new therein, and desire to secure by Letters Patent, is—

1. A felt composed of the fibers of kapok or ceiba, said fibers having their surfaces cleansed, disintegrated and roughened, and being felted together, substantially as and for the purposes set forth.

2. A felt composed of alternate strata of animal fibers and kapok or ceiba fibers felted together, said kapok or ceiba fibers having their surfaces cleansed, disintegrated and roughened and being felted together, substantially as and for the purposes set forth.

In witness whereof I have hereunto signed my name in the presence of two subscribing witnesses.

ANTENORE FUSAI.

Witnesses:
 ING. Y. CAPUCIN,
 ENRICO MARAUD.